United States Patent [19]

Harris et al.

[11] Patent Number: 5,491,200
[45] Date of Patent: Feb. 13, 1996

[54] POLYCAPROLACTAM MOLECULAR COMPOSITES

[75] Inventors: Frank W. Harris, Akron, Ohio; Hong Ding, Pittsburgh, Pa.

[73] Assignee: Edison Polymer Innovation Corporation, Brecksville, Ohio

[21] Appl. No.: 171,523

[22] Filed: Dec. 22, 1993

[51] Int. Cl.⁶ .............................. C08G 69/00; C08G 69/48
[52] U.S. Cl. ........................... 525/419; 528/322; 528/323
[58] Field of Search .................................. 528/322, 323; 525/419

[56] References Cited

U.S. PATENT DOCUMENTS 5,068,292  11/1991  Lenke et al. .

OTHER PUBLICATIONS

Barton et al., Comprehensive Organic Chemistry, vol. 2, pp. 1016–1019 (1979).
"Polymer Composites of Rigid and Flexible Molecules: System of Wholly Aromatic and Aliphatic Polyamides", *J. Macromol. Sci.–Phys.*, Motowo Takayanagi, Takayuki Ogata, B17(4), 591–615 May, 1980.
"Molecular Composites via In Situ Polymerization: Poly(Phenylene Terephthalamide)–Nylon 3", *Journal of Applied Polymer Science*, D. Roger Moore and Lon J. Mathias, vol. 32, 6299–6315 Dec., 1986.
"In–Situ Molecular Composites", 37th International SAMPE Symposium, D. R. Wiff and G. M. Lenke, Mar. 9–12, 1992 (pp. 991–1002).
"Graft Copolymers of Rigid–Rod Polymers as Single–Component Molecular Composites", M. Dotrong, M. H. Dotrong, and R. C. Evers, Apr., 1992, pp. 477–478.
"Principles of Polymerization", Second Edition, George Odian, John Wiley & Sons, pp. 152–155 (1981).

*Primary Examiner*—Jeffrey Mullis
*Attorney, Agent, or Firm*—Hudak & Shunk Co.

[57] ABSTRACT

Polyimides serve as reinforcing rigid-backbone segments in nylon 6 copolymers. In a first embodiment, the copolymers are prepared from polyimides containing acylated caprolactam moieties pendant therefrom which provide sites for polycaprolactam grafts. In a second embodiment, polyimide oligomers end-capped with acyl-activated caprolactam rings permit the formation of block caprolactam copolymers that include polyimide reinforcing segments. The polyimide/nylon 6 copolymers have properties superior to those of nylon 6 and can also serve as compatibilizing agents.

17 Claims, 1 Drawing Sheet

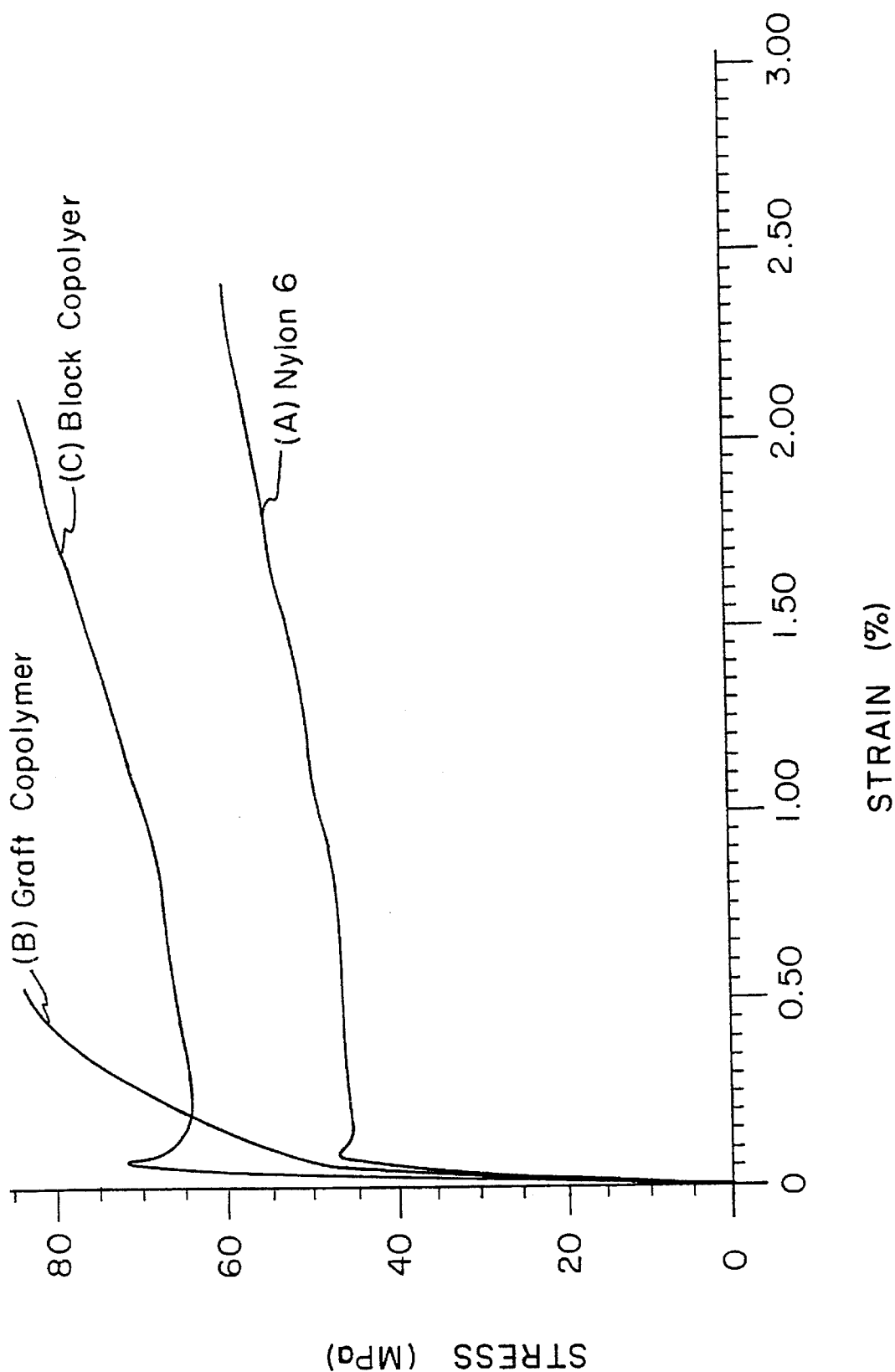

POLYCAPROLACTAM MOLECULAR COMPOSITES

TECHNICAL FIELD

This invention relates to the preparation of improved composite materials, especially to molecular composites. More particularly, this invention relates to composites comprising a molecular dispersion of relatively small amounts of reinforcing rigid-backbone polymers chemically associated with random coil polymer matrices. Specifically, this invention relates to rigid-backbone molecules containing acyl-activated caprolactam rings that act as reinforcing segments when chemically combined with polycaprolactam.

BACKGROUND OF THE INVENTION

The enhancement of plastic materials through the incorporation of reinforcing materials therein has been recognized. Polyesters, for example, have long been combined with fiberglass in instances where the articles manufactured must be characterized by improved physical properties. While such composites enjoy wide-spread popularity as a consequence of their enhanced performance, they exhibit certain disadvantages that limit their usefulness. For example, relatively high loadings of the reinforcing fibers are required to achieve the improved properties exhibited by such materials. However, due to such high-fiber loadings, and because of the length of the fibers needed to impart a reinforcing effect, processing of the materials is frequently difficult.

There have been many recent attempts, therefore, to incorporate reinforcing molecules in the matrix material, for instance, by physically blending the components of the composite together. In this regard, dispersions of reinforcing rigid-backbone or extended-chain polymers have often been physically combined with random coil polymer matrices. Such composites are normally distinguished by possessing improved tensile strengths, moduli, elongations and heat resistance, compared to fiber-reinforced systems.

The physical blending referred to can be accomplished, for instance, by melt-mixing thermoplastic nylon 66 with reinforcing materials such as poly-p-phenylene terephthalamide, M. Takayanagi et al., J. Macromol Sci.—Physics B17, 591 (1980). Similarly, W. F. Hwang et al., J. Macromol Sci.—Physics 822(2), 231 (1983) have codissolved reinforcing poly(p-phenylenebenzobisthizole) in plastic materials. U.S. Pat. No. 4,377,546 teaches composite materials cast from methane sulfonic acid, while U.S. Pat. No. 4,631,318 discloses a composite formed from poly(p-phenylenebenzobisthizole) and nylon prepared from a solution of methane sulfonic acid. Further, U.S. Pat. No. 4,614,784 suggests a solution of a rigid-backbone-like liquid crystalline polymer in a polymerizable solvent that is subsequently polymerized to yield a polymeric liquid crystalline or isotropic alloy. U.S. Pat. No. 5,068,292 teaches the solution of the precursors to rigid-backbone polymers in the presence of the matrix polymers, polymerization of the materials proceeding thereafter in sequence, or simultaneously.

The above techniques are not without certain difficulties, however, including such things as the need to use strong acids as solvents; troubles experienced in achieving the desired dispersions on a molecular level; limited solubilities of suitable rigid-backbone polymers in polymerizable solvents, and other problems.

Furthermore, although molecular composites can be prepared by the physical blending of components, phase separations are frequently encountered, especially with increasing levels of the rigid-backbone molecules, or during the processing of the blends. For example, there is often a tendency of the several components to arrange themselves into separate phases, defeating the desired reinforcement objective. Such results arise, for instance, as a consequence of the limited compatibility of the rigid-backbone components with the random coil polymers, caused by the relatively low entropy of mixing.

In view of the preceding, therefore, it is a first objective of this invention to provide improved reinforced polymeric composites.

A second objective of this invention is to provide molecular composites by chemically bonding rigid-backbone reinforcing molecules with random coil matrix polymers.

Another aspect of this invention is to provide reinforcing rigid-backbone polyimides useful for reinforcing polycaprolactam.

An additional aspect of this invention is to prevent reinforcing molecules from phase separation in nylon 6 polymers with which they are combined.

Yet an additional aspect of this invention is to provide molecularly reinforced polycaprolactams that show improved characteristics such as superior chemical resistance, better thermal stability, and enhanced mechanical properties.

A still additional aspect of this invention is to provide chemically bonded polyimide/nylon 6 molecules that overcome the inherent deficiencies of nylon 6 relative to other materials of comparable cost, for example, their low heat deflection temperature, poor dimensional stability, and reduced physical impact strength.

A further aspect of this invention is to provide a rigid polyimide polymer chain grafted from or blocked to, or with a nylon-6 polymer chain.

Another aspect of this invention is to provide polymer compatibilizing agents.

Still another aspect of this invention is to provide synthetic fibers formed from molecular composites.

BRIEF DESCRIPTION OF THE INVENTION

The preceding and additional aspects of the invention are provided by the process of preparing a rigid-backbone polyimide oligomer that includes as a part thereof at least one caprolactam ring having an activating acyl group attached to the nitrogen, and subsequently reacting the oligomer with caprolactam to form a molecularly reinforced polymer.

The preceding and still other aspects of the invention are provided by a molecular composite formed by the process of the preceding paragraph.

The preceding and yet other aspects of the invention are provided by a fiber formed from the molecular composite of the preceding paragraph.

The preceding and further aspects of the invention are provided by an oligomer useful in preparing molecular composites, the oligomer comprising a rigid-backbone polyimide oligomer including as a part thereof at least one caprolactam ring having an activating acyl group attached to the nitrogen atom contained in the ring.

The preceding and additional aspects of the invention are provided by the compound:

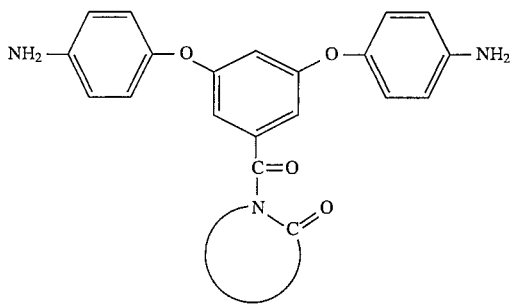
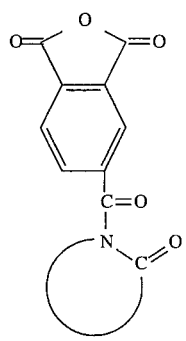

, where

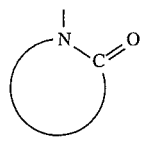

represents the caprolactam ring.

The preceding and yet additional aspects are provided by the compound:

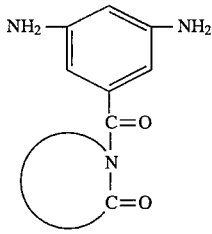

The preceding and other aspects of the invention are provided by the compound:

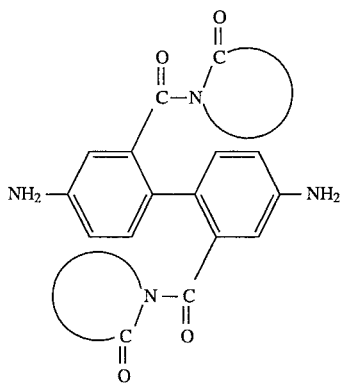

The preceding and still further aspects of the invention are provided by the compound:

BRIEF DESCRIPTION OF THE FIGURE

FIG. 1 is a stress-strain diagram comparing nylon 6 with polyimide/graft/nylon 6 and nylon 6/block/polyimide/block/nylon 6 polyimides of the invention.

DETAILED DESCRIPTION OF THE INVENTION

As previously indicated, molecular composites are comprised of dispersions of relatively small amounts of reinforcing rigid-backbone or extended chain polymers in random coil polymer matrices. Such molecularly reinforced systems typically display enhanced tensile strengths, moduli, elongations and heat resistance, compared to conventional fiber-reinforced systems. Although molecular composites can be prepared by solution blending the components, phase separation is frequently encountered during melt processing, resulting in limited compatibility between the rigid-backbone segments and the random coil polymers. While one solution to this problem would be to chemically bond the rigid-backbone molecules directly to the random coil polymers in a graft or block copolymer, relatively few examples of this approach have been suggested despite the fact that such copolymers can also be used as compatibilizers in immiscible polymer blends.

The invention disclosed herein involves several related concepts. In this regard, in one embodiment, an acyl-activated caprolactam ring is incorporated in diamine monomers that are subsequently polymerized with dianhydrides to provide polyimides containing pendant acylated caprolactam moieties. Thereafter, the polyimides are used as multifunctional polymeric activators for the anionic, ring-opening polymerization of caprolactam.

In a further, related embodiment, an acyl-activated caprolactam ring is incorporated in a mono-functional amine or anhydride which is then used as an end-capping agent for polyimide oligomers. In both the embodiments described, the compounds produced are subsequently used as activators for the polymerization of caprolactam.

Graft and block copolymers prepared from molten caprolactam containing minor amounts of the polyimide activators described, for example, provide higher tensile strengths and moduli comparable to commercial nylon 6. The materials also exhibit improved thermal and thermal oxidative stability, chemical resistance, conventional stability and good melt processability.

While not intending to be bound by the operative mechanism, it is believed that the presence of the carbonyl group attached to a ring amide nitrogen in N-acyllactam increases the electron deficiency of the amide linkage. This, in turn, increases the reactivity of the amide ring structure, facilitating its attack by the nucleophilic lactam anion. Propagation is considered to be the reaction between a propagating N-acyllactam species and a lactam anion, followed by a fast proton-exchange with a monomer of interest to regenerate the lactam anion and the propagating N-acyllactam. The propagating center is the cyclic amide linkage of the N-acyllactam, and the monomer does not add to the propagating chain, but rather is the monomer anion which adds to the propagating chain. Such anionic polymerizations are advantageous in that the polymerization rate is significantly higher in view of the fact that both reacting species, the propagating center and the monomer anion, are more reactive than their counterparts in, for instance, hydrolytic polymerizations.

In the first embodiment described, the two diamines groups react with the dianhydrides to form a "backbone" from which the acyllated caprolactam moieties extend as appendages, represented in the following structure in which the polyimide backbone is represented as the horizontal bar.

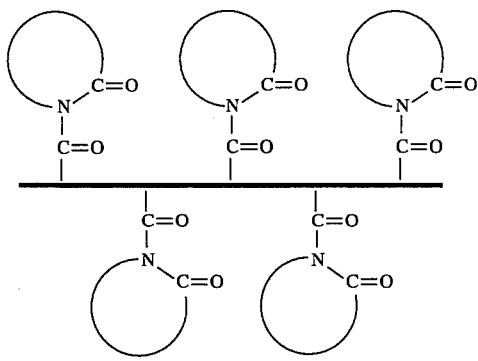

The second embodiment may be represented by the following structural formula in which the horizontal bar again represents a polyimide chain similar to the one set forth above, end-capped with acyllated caprolactam moieties.

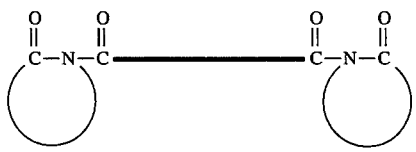

The polymerization activators described in the preceding are rigid-backbone structures that can be subsequently reacted with ε-caprolactam to provide in the case of the first embodiment a structure that takes the following form in which the horizontal bar is a polyimide structure, while the circles represent the acyllated caprolactam structure, and the waved lines represent polycaprolactam grafts.

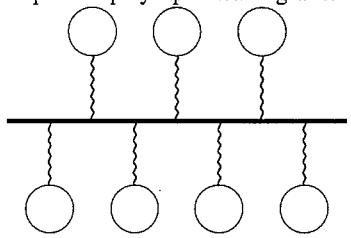

In the case of the second embodiment described, the reaction of the activator provides a molecular structure that may be represented by the following structure in which the symbols appearing have the significance previously indicated:

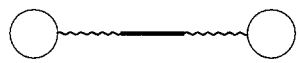

In the case of the polyimides containing pendant acyllated caprolactam moieties, multi-functional compounds suitable as activators for the anionic-ring-opening polymerization of caprolactam, the compounds may be represented as diamines having the following general formula, where

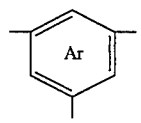

represents an aromatic structure:

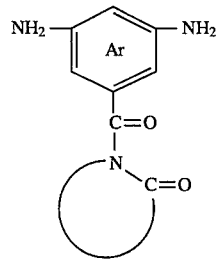

Such monomers may include, for example, diamines such as:

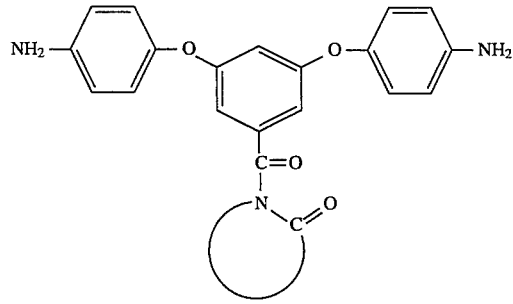

3,5-bis(4-aminophenoxy)benzoyl caprolactam (DAPBC);

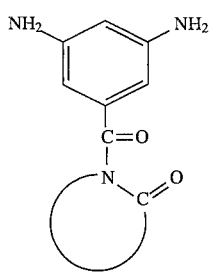
3,5-diaminobenzoyl caprolactam;
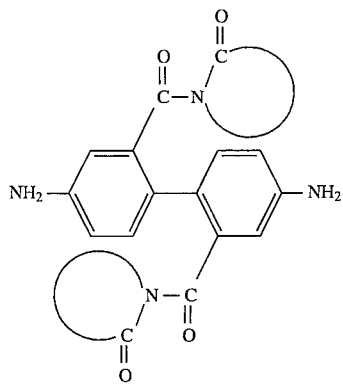
2,2'-bis(carboxy-N-caprolactam)-4,4'-diaminobiphenyl, and others.
Monomers thus prepared are subsequently reacted with a dianhydride, for example, in the following sequence of reactions to provide a polyfunctional polyimide activator:
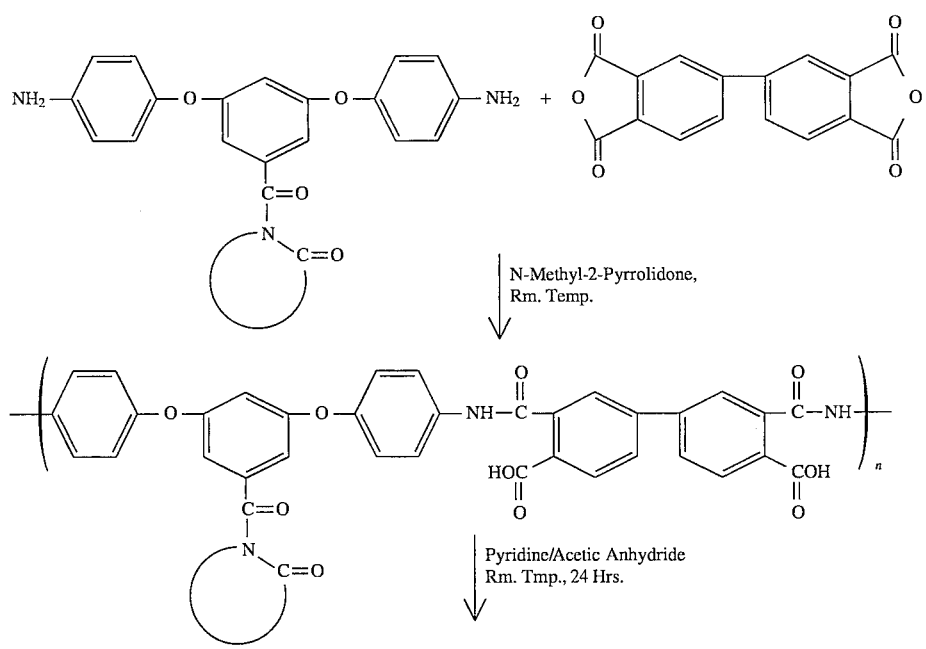

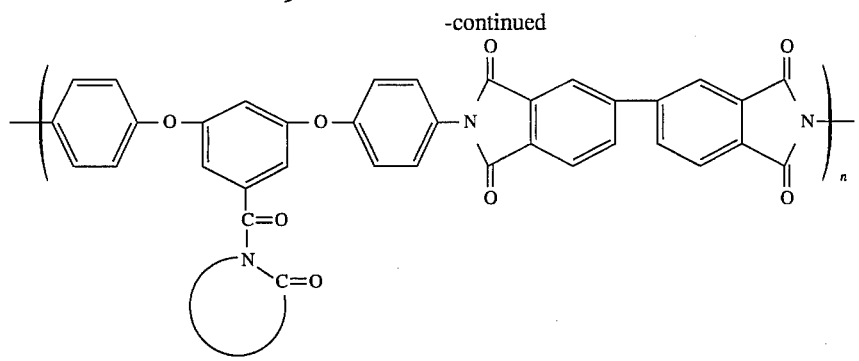

With respect to the dianhydride portion of the activator, any of a number of dianhydrides may be employed, for example, in addition to 3,3',4,4'-biphenyl tetracarboxylic dianhydride (BPDA) one may employ:

pyromellitic dianhydride (PMDA);

3,3',4,4'-benzophenone tetracarboxylic dianhydride (BTDA);

2,3,3',4-benzophenone tetracarboxylic dianhydride;

2,2',3,3'-benzophenone tetracarboxylic dianhydride, 2,2'-bis[4-(3,4-dicarboxyphenoxy)pheny]propane dianhydride (BISA-DA);

bis(2,3-dicarboxyphenyl)methane dianhydride;

bis(2,5,6-trifluoro-3,4-dicarboxyphenyl)methane dianhydride, 2,2-bis (3,4-dicarboxyphenyl)propane dianhydride;

2,2-bis (3,4-dicarboxyphenyl)-1,1,1,3,3,3-hexafluoropropane dianhydride (6FDA);

bis(3,4-dicarboxyphenyl)ether dianhydride;

bis(3,4-dicarboxyphenyl)sulfone dianhydride (DSDA);

4,4'-[4,4'-isopropylidene-di(p-phenyleneoxy)]bis (phthalic anhydride) (BPADA);

N,N-(3,4-dicarboxyphenyl)-N-methylamine dianhydride;

bis(3,4-dicarboxyphenyl)diethylsilane dianhydride;

2,3,6,7-napthalene tetracarboxylic dianhydride;

1,2,5,6-naphthalene tetracarboxylic dianhydride;

2,6-dichloronaphthalene-1,4,5,8-tetracarboxylic dianhydride;

thiophene-2,3,4,5-tetracarboxylic dianhydride;

pyrazine-2,3,5,6-tetracarboxylic dianhydride; and pyridine-2,3,5,6-tetracarboxylic dianhydride.

Furthermore, it is often desirable to use mixtures of the dianhydrides or diamines so as to obtain a desired number of the pendant acylated caprolactam grafts in order to assure that the desired melt viscosity and chain softness are obtained. In this regard, if the number of graft side chains is too great, the resulting product may have a melt viscosity such that it is difficult to process. By introducing diamines without pendant acylated caprolactam moieties, the number of graft sites per molecule can be reduced, producing a corresponding reduction in melt viscosity.

Suitable diamines containing no acyl groups are, for example:

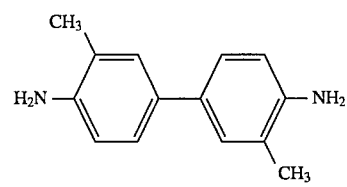

3,3'-dimethyl-4,4'-diaminobiphenyl (OTOL);

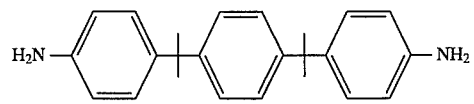

2,2'-bis (4-aminophenyl)-p-diisopropylbenzene (BISP);

o-phenylene diamine;

m-phenylene diamine;

p-phenylene diamine;

2,4-diaminotoluene;

1,4-diamino-2-methoxybenzene;

1,4-diamino-2-phenylbenzene;

1,3-diamino-4-chlorobenzene;

4,4'-diaminobiphenyl;

4,4,-diaminodiphenylmethane;

2,2-bis(4-aminophenyl)propane;

2,2-bis(4-aminophenyl)-1,1,1,3,3,3-hexafluoropropane;

4,4'-diaminodiphenyl ether;

3,4'-diaminodiphenyl ether;

1,3-bis(3-aminophenoxy)benzene;

1,3-bis(4-aminophenoxy)benzene;

1,4-bis(4-aminophenoxy)benzene;

4,4'-bis(4-aminophenoxy)biphenyl;

4,4'-bis(3-aminophenoxy)biphenyl;

2,2-bis[4-(4-aminophenoxy)phenyl]propane (BAPP);

2,2-bis[4-aminophenoxy)phenyl]-1,1,1,3,3,3-hexafluoropropane;

4,4'-diaminodiphenyl thioether;

4,4'-diaminodiphenyl sulfone;

2,2'-diaminobenzophenone;

3,3'-diaminobenzophenone;

1,8-diaminonaphthalene;

1,5-diminonaphthalene;

2,6-diaminopyridine;

2,4-diaminopyrimidine;

2,4-diamino-s-triazine;

2,2'-bis(trifluoromethyl)-4,4'-diaminobiphenyl;
2,2'-dibromo-4,4'-diaminobiphenyl;
2,2'-dicyano-4,4'-diaminobiphenyl;
2,2'-dichloro-6,6'-dimethyl-4,4'-diaminobiphenyl;
2,2'-dimethyl-4,4'-diaminobiphenyl;
2,2'-dicarboalkoxy-4,4'-diaminobiphenyl; and
2,2'-dicarboalkoxy-6,6'-dimethyl-4,4'-diaminobiphenyl;
and others, including mixtures thereof.

The multi-functional polymeric activator is subsequently reacted with ε-caprolactam by being dissolved in the melted material. It is necessary that the polyimide activator be soluble in the melted caprolactam to allow the polymerization to occur. For this reason, it is likewise often desirable to incorporate a combination of different dianhydrides in the polyimide backbone in order to assure its solubility in the ε-caprolactam. Such adjustments depend upon the reinforced product being prepared and the uses to which it is to be put; however, such system variations are well within the skill of those knowledgeable in the art and are readily carried out.

It is desirable that the diamine monomers and dianhydrides contain aromatic rings since the same confer thermal stability and enhance the reinforcing rigidity of the multi-functional polymeric activators. However, in order to realize cost economies and to achieve the solubility characteristics referred to, it is also sometimes desirable to include polyimide activators possessing aliphatic structures as a part thereof.

The molecular weight of the backbone portion of the multi-functional polymeric activators may be varied to suit the physical properties of the molecular composite required; however, polymeric activators having a molecular weight such that they exhibit an intrinsic viscosity of from about 0.2 to about 1.0 dL/g centipoise have been found to be particularly desirable.

A second embodiment of the invention comprises acyl-activated caprolactam rings incorporated in mono-functional amines or anhydrides. Such compounds can be used to prepare end-capped polyimide oligomers useful in the preparation of block copolymers.

Among such end-capping agents may be mentioned compounds of the general formula:

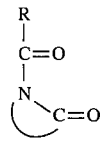

, where R is an aromatic amine or a phthalic anhydride, for example:

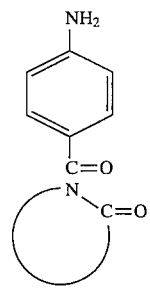

4-aminobenzoyl caprolactam;

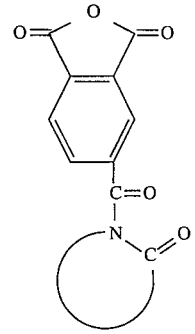

; 1,2,4-trimellitoyl anhydride N-caprolactam, and others, including mixtures of such compounds.

The monofunctional compounds with the incorporated acyl-activated caprolactam rings are then used as end-capping agents for the polyimide oligomers described in connection with the backbone portion of the multi-functional activators of the first embodiment of the invention, to which reference has been made in the preceding. Such end-capped polyimides, for example, may take the following form:

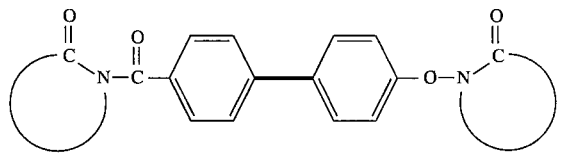

Again, the solid line represents the polyimide backbone formed from the diamines and dianhydride compounds previously referred to, including mixtures of such diamines and dianhydrides. Also, as previously indicated, there may be included diamines and dianhydrides that are aliphatic or which contain aliphatic or substituted aliphatic portions. Suitable compounds may include, but are not limited to the dianhydrides and diamines referred to previously, including mixtures thereof.

For instance, the reaction may proceed in accordance with the following equations, in which the broken line shown represents a polyamic acid linkage:

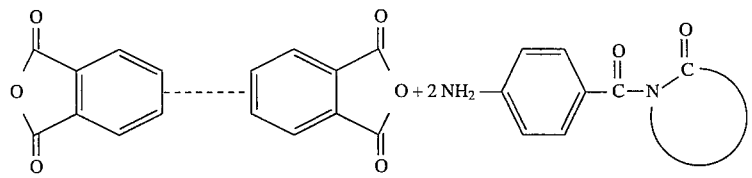

-continued

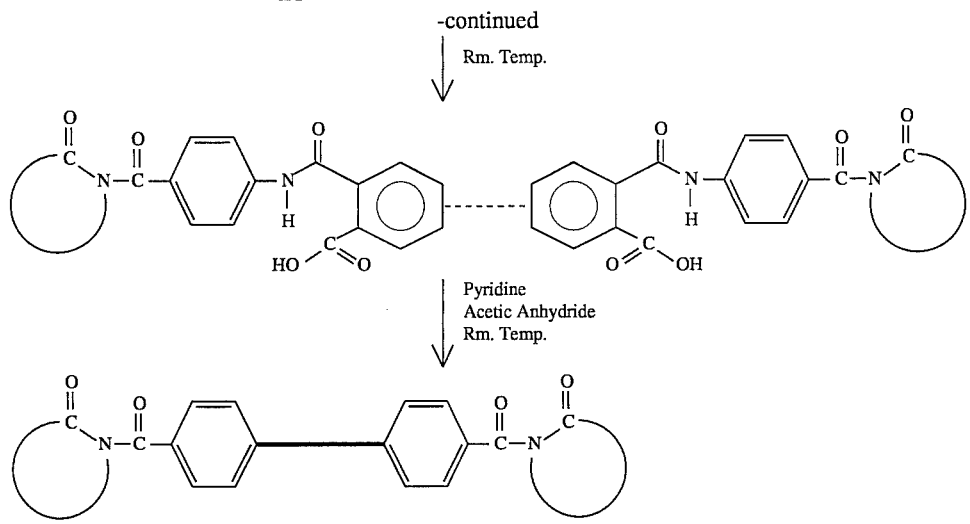

As in the case of the multi-functional activators, the molecular weight of the backbone of the endcapping agent will vary, depending upon the physical properties of the product desired; however, commonly, the polyimide will have a number average molecular weight, Mn, of about 1,000 to 20,000.

The polymeric activators described in connection with the first and second embodiments of the invention are subsequently employed to prepare reinforced polylactam polymers.

The procedure involves dissolving the polymeric activator, together with a suitable catalyst, for example, a catalyst prepared from an anionic caprolactam ring in molten ε-caprolactam. With respect to the multi-functional activators, the reaction proceeds in the following fashion:

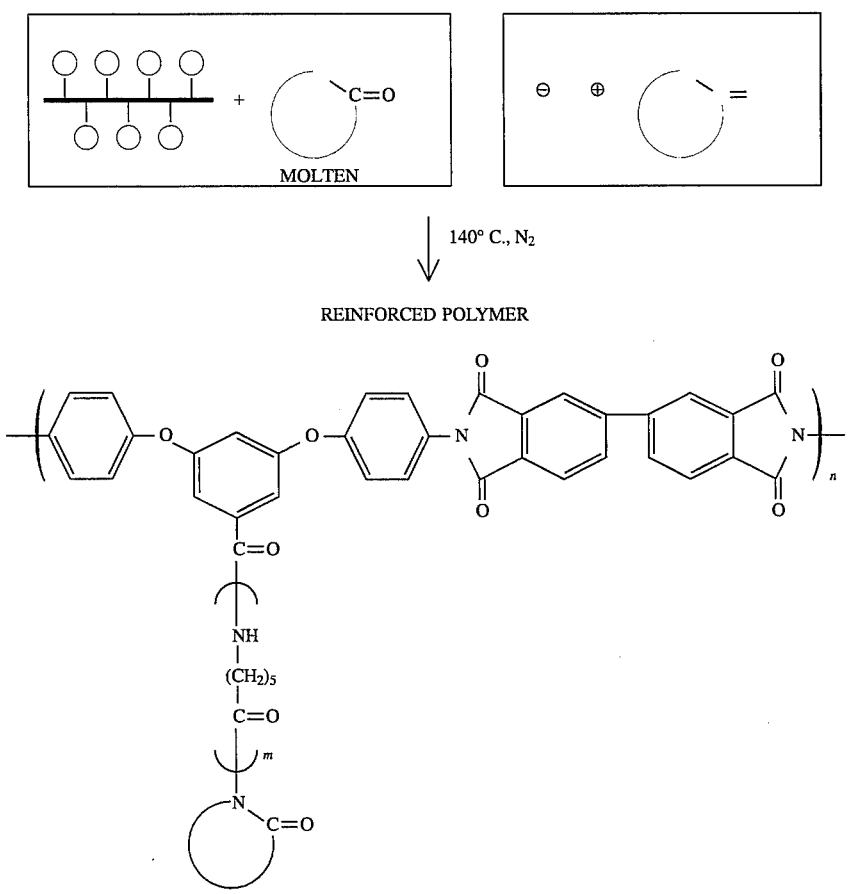

The catalyst may conveniently comprise ionic caprolactam rings formed by the reaction of, for instance, a Grignard reagent such as phenyl magnesium bromide with molten ε-caprolactam, or by the reaction of metallic sodium, sodium hydride or potassium with molten ε-caprolactam. Following its preparation, the catalyst is dissolved in molten ε-caprolactam, together with the polymeric activator at a temperature of from about 130° C. to about 160° C., and the reaction is allowed to proceed under a nitrogen atmosphere, for example, from approximately 1 to 2 hours.

The amount of activator incorporated in the molten caprolactam will depend upon the physical properties required of the product, and the solubility characteristics of the activator in the molten caprolactam; however, commonly from about 4 percent to about 20 percent of the activator will be used.

In the case of the polycaprolactam polymers polymerized with multi-functional polyimide activators, the reaction will be permitted to proceed until the grafted pendant polycaprolactam chains attain a number average molecular weight, $M_n$, of from about 2,000 to 15,000, although greater or lesser molecular weights may be prepared should the physical properties of the final product warrant them.

In the case of block polycaprolactam polymers polymerized with the end-capped polyimide activators of the second embodiment described, the polymerization of the ε-caprolactam with the end-capped activators proceeds as follows:

TABLE I

| Weight % PI[b] in Nylon 6 Feed | Mn of PI | TGA (°C.)[a] Td (°C.) in $N_2$ |
|---|---|---|
| 0 (nylon 6) | | 313 |
| 3 | 6000 | 375 |
| 7 | 6000 | 380 |
| 4 | 12000 | 373 |
| 6 | 12000 | 373 |

[a]Temperatures at which a 5% weight loss occurred in the designated atmosphere with a heating rate of 10° C./min.
[b]PI = OTOL/BPDA/6FDA (100/50/50 weight %). OTOL = 3,3'-dimethyl-4,4'-diaminobiphenyl BPDA = 3,3',4,4'-biphenyl tetracarboxylic dianhydride 6FDA = 2,2'-bis (3,4-dicarboxyphenyl) hexafluoropropane dianhydride.

Table II shows the flexural modulus and glass transition temperature of typical nylon 6/block/polyimide/block/nylon 6 compounds of the invention. As is apparent from the values shown in the table, the rigidifying influence, i.e., the flexural modulus, of the reinforced polymers of the invention are markedly superior to unmodified nylon 6. Likewise, the glass transition temperatures of the reinforced materials of the invention are significantly higher than that of nylon 6.

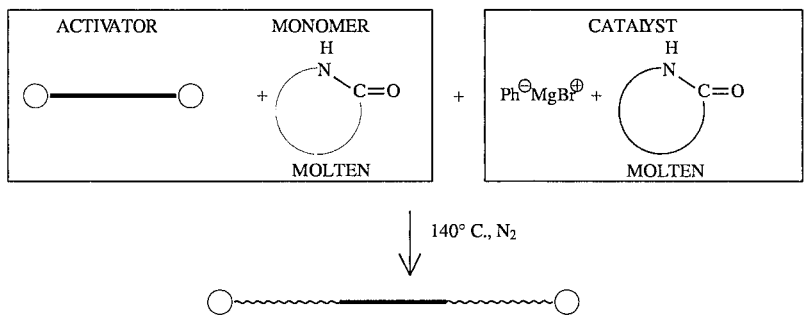

As in the case of the reinforced polycaprolactams prepared from multi-functional activators, the catalyst can comprise ionic caprolactam rings formed from Grignard reagents and sodium, sodium hydride, or potassium. The reaction conditions are essentially the same, and the reaction will typically be allowed to proceed until the number average molecular weight of the nylon blocks is from about 2,000 to 15,000.

Such reinforced polymers may be used alone, or they may be used as compatibilizing agents, e.g., for compatibilizing mixtures of nylon with polyimides; they can also be used to reinforce nylon polymers by themselves.

As previously indicated, while nylon 6 has good processability, it is deficient in thermal stability and in its physical characteristics. Polyimides, on the other hand, while having excellent mechanical properties and high thermal stability are difficult to process, as well as expensive. The reinforced polymers of the invention described in the preceding, tend to combine the desirable characteristics of both types of polymers, while avoiding their disadvantages.

Such benefits are shown, for example, in Table I which compares the temperatures at which a 5 percent weight loss occurs in nylon 6/block/polyimide/block/nylon 6 reinforced compositions of the invention, i.e., the second embodiment, as opposed to Nylon 6 when both are subjected to thermal gravimetric analysis.

TABLE II

| Wt. % PI in Nylon 6 Feed | Mn of PI | Flexural Mod.,[a] E' (MPa), 0.1 Hz | | | Tan δ (0° C.)[b], 0.1 Hz |
|---|---|---|---|---|---|
| | | 0° C. | 75° C. | 150° C. | α |
| 0 (nylon 6) | | 1120 | 395 | 206 | 62 |
| 3[c] | 6000 | 1610 | 882 | 311 | 78 |
| 7[c] | 6000 | 1710 | 937 | 282 | 79 |
| 4[c] | 12000 | 1590 | 822 | 418 | 70 |
| 6[c] | 12000 | 1800 | 1420 | 790 | 84 |
| 5[d] | 12000 | 1280 | 558 | 200 | 43 |
| 15[d] | 12000 | 2600 | 1750 | 729 | 86 |

[a]DMA spectra were obtained in $N_2$ with a heating rate of 1° C./min. by Seiko DMS 200 on samples that were compression molded at 260° C.
[b]Maximum of the tan δ peak.
[c]PI = OTOL/BPDA/6FDA (100/50/50 weight %). OTOL = 3,3'-dimethyl-4,4'-diaminobiphenyl BPDA = 3,3,4,4'-biphenyl tetracarboxylic dianhydride 6FDA = 2,2'-bis (3,4-dicarboxyphenyl) hexafluoropropane dianhydride
[d]PI = BISP/BPADA BISP = 2,2'-bis (4-aminophenyl)-p-diisopropylbenzene BPADA = 4,4'-[4,4'-isopropylidene-di (p-phenyleneoxy)]bis(phthalic anhydride)

Tables III and IV compare the mechanical properties of nylon 6 with the polyimide/graft/nylon 6 compounds of the invention. Again, a marked superiority relative to nylon 6 is shown.

TABLE III

| Sample | DAPBC*/OTOL/BPDA (Weight %) | Tensile Modulus (MPa) | Tensile Strength (MPa) |
|---|---|---|---|
| Nylon 6 |  | 1000 | 65 |
| PI-1 | 100/ 0/100 (5 wt. %) | 1217 | 73 |
| PI-2 | 70/30/100 (5 wt. %) | 1428 | 84 |
| PI-3 | 50/50/100 (5 wt. %) | 1496 | 81 |

*DAPBC = 3,5-bis (4,4'-diaminophenoxy) benzoyl caprolactam
Note:
All the samples were molded on a Mini-Max Injection Molder.

TABLE IV

| Sample | DAPBC/ BAPP/- BPADA (Weight %) | Yield Strength MPa | Tensile Strength MPa | Tensile Modulus | Elongation % |
|---|---|---|---|---|---|
| Nylon 6 |  | 44–56 | 65 | 1000 | 240 |
| PI-4 | 30/70/100 (5 wt. %) | 92–102 | 82–88 | 1670–1910 | 61–160 |
| PI-5 | 10/90/100 (15 wt. %) | 84–110 | 74–78 | 1743 | 60–116 |

FIG. 1 compares the mechanical properties of nylon 6 with polyimide/graft/nylon 6 and nylon 6/block/polyimide/block/nylon 6 molded samples, the polyimide-containing materials being those of the invention.

Examination of FIG. 1 demonstrates the improved toughness, i.e., the area under the curve of the reinforced block copolymers of the invention, compared with nylon 6. Similarly, the initial slope of the stress-strain curve reflecting the reinforced graft and block copolymers demonstrates the improved modulus of the copolymers relative to nylon 6.

In addition to their other uses as described, the molecular composites of the invention, particularly the nylon 6/block/polyimide/block/nylon 6 copolymers of the second embodiment of the invention, are useful in the preparation of synthetic fibers displaying superior physical characteristics. Such fibers may be formed directly, or after blending with polyamides such as for example nylon 6.

While not intended to be limiting in nature, the following examples are illustrative of the invention.

EXAMPLE 1

Synthesis of 3,5-bis(4-aminophenoxy)benzoyl caprolactam (DAPBC) monomer

Methyl 3,5-dihydroxybenzoate

A mixture of 3,5-dihydroxybenzoic acid (106 g, 0.69 mol), 1200 ml of methanol and 6 ml of concentrated sulfuric acid is added to a 2L, three-necked round-bottom flask equipped with a Soxhlet extraction apparatus, the thimble of the Soxhlet being packed with 4Å molecular sieves. The solution is stirred and heated at reflux for 24 hours and after removal of the methanol from the reaction solution under reduced pressure, the powder residue is washed with water and recrystallized from water to yield 87 percent of white, needle-like crystals: mp 167°–167.5° C.

Methyl 3,5-bis(4-nitrophenoxy)benzoate

A mixture of potassium carbonate (98.72 g, 0.714 mol) and 550 ml of N,N-dimethylacetamide (DMAC) is added to a 1L, three-necked round-bottom flask equipped with an overhead stirrer, condenser and a nitrogen inlet tube. Nitrogen is bubbled through the solution for 1 hour, following which methyl 3,5-dihydroxybenzoate (60.00 g, 0.357 mol) and 1-fluoro-4-nitrobenzene (100.79 g, 0.714 mol) are added. The slurry solution is stirred and heated to 80°–90° C. under nitrogen for 10 hours, and the mixture is then filtered while hot to remove inorganic salts. The filtrate is kept in a freezer overnight and the yellow crystals are collected by filtration, washed with water and dried. The product is recrystallized from ethyl acetate to yield 68 percent of yellow crystals: mp 180.5°–182.0° C.

3,5-Bis(4-nitrophenoxy)benzoic acid

A mixture of methyl 3,5-bis(4-nitrophenoxy) benzoate (50.0 g, 0.122 mol), 350 ml of acetic acid, 150 ml of concentrated sulfuric acid, and 90 ml of water is added to a 1L, three-necked, round-bottom flask equipped with an overhead stirrer and condenser. The slurry solution is heated to 120° C. for 24 hours and then allowed to cool. The product formed is collected by filtration of the slurry reaction solution, washed with water until the PH=6–7, then with cold methanol, and finally dried at 110° C. under reduced pressure to provide 45.8 g (95 percent) of white crystals: mp 230°–231.5° C.

3,5-Bis (4-nitrophenoxy)benzoyl chloride

A mixture of 3,5-bis (4-nitrophenoxy) benzoic acid (51.9 g, 0.131 mol) and thionyl chloride (478 ml, 6.55 mol) are heated at reflux for 5 hours, with the excess thionyl chloride being removed by distillation. The residue is dried at 85° C. under vacuum overnight in the same reactor.

3,5-Bis(4-nitrophenoxy)benzoyl caprolactam

A solution of ε-caprolactam (14.82 g, 0.131 mol) in 400 ml of benzene is added to the above reactor containing 0.131 mol of 3,5-bis(4-nitrophenoxy)benzoyl chloride. The mixture is heated to 80°–90° C., and after all the reactants are dissolved, 150 ml of pyridine is added. The solution is stirred at 90° C. for 3 hours and the pyridine/acid chloride salt removed by filtration, the filtrate being kept in a freezer. White crystals formed from the filtrate are collected by filtration and dried. In order to remove traces of the 3,5-bis(4-nitrophenoxy)benzoic acid, the product is further purified by chromatography using silica gel as filler and ethyl acetate as eluate to yield 65 percent of white crystals: mp 157°–158° C.

3,5-Bis(4-nitrophenoxy)benzoyl caprolactam monomer

A mixture of 3,5-bis(4-nitrophenoxy)benzoyl caprolactam (2.00 g, 4.07 mmol), 0.08 g of palladium on activated carbon (palladium content 5 percent) and 30 ml of absolute ethanol is stirred with hydrogen under 1 atmosphere at 15° C. in a hydrogenator. When the theoretical quantity (0.024 mol) of hydrogen has been absorbed, the solution is filtered through celite under nitrogen to remove the catalyst. Ethanol is then removed from the filtrate under reduced pressure and the residue is dissolved in methylene chloride. The solution is subsequently filtered through celite under nitrogen, the product being obtained by removing solvent under reduced pressure to yield 68 percent of yellow powder: mp 96°–98° C.

EXAMPLE 2

Synthesis of 3,5-diamino benzoyl caprolactam (DABC) monomer 3,5-Dinitrobenzoyl caprolactam A solution of 3,5-dinitrobenzoyl chloride (50.00 g, 0.22 mol), freshly distilled ε-caprolactam (24.54 g, 0.22 mol) and 500 ml of benzene is added to a 1L, three-necked, round-bottom flask equipped with an overhead stirrer, condenser and a nitrogen inlet tube. The solution is heated to 90°–100° C. After all the solids are dissolved, 165 ml of pyridine is added. White pyridine salts form immediately, and the reaction solution is kept at 90°–100° C. for 1 hour before removing the pyridine salts by filtration. The solvent is removed from the filtrate under reduced pressure and the residue is washed by a 5 percent NaHCO$_3$ aqueous solution and distilled water several times before being dried. The product is recrystallized from a mixture of ethyl acetate and hexane to obtain 45 g (68 percent) of white crystals: mp 126°–126.5°.

3,5-Diaminobenzoyl caprolactam monomer

A mixture of 3,5-dinitrobenzoyl caprolactam (2.00 g, 4.07 mmol), 0.08 g of 5 percent palladium on carbon and 30 ml of absolute ethanol is stirred with hydrogen under a pressure of 1 atmosphere at 10° C. When the theoretical quantity of hydrogen (0.024 mol) has been absorbed, the solution is filtered through celite. White crystals form when the filtrate is kept in a freezer, and the final product is obtained by recrystallization from CH$_2$Cl$_2$ to yield 65 percent of white crystals: mp 122°–124° C.

EXAMPLE 3

2,2'-Bis(carboxy-N-caprolactam)-4,4'-diaminobiphenyl monomer

Methyl 2-chloro-5-nitrobenzoate

A mixture of 2-chloro-5-nitrobenzoic acid (70.0 g, 0.35 mol), 280 ml of methanol and 27 ml of concentrated sulfuric acid is added to a 500 ml, three-necked round-bottom flask equipped with an overhead stirrer and condenser, and the solution is stirred and heated at reflux for 24 hours. After the solution cools, yellow crystals form and are collected by filtration. The product is washed with water and recrystallized from ethyl acetate/hexane to yield 68 percent of yellow crystals: mp 69.5°–70.0°.

2,2'-Bis(carbomethoxy)-4,4'-dinitrobiphenyl

A mixture of methyl 2-chloro-5-nitrobenzoate (66.5 g, 0.309 mol) and sand (200 g) is added to a 500 ml, three-necked round-bottom flask equipped with an overhead stirrer, condenser and a nitrogen inlet tube. After the mixture is heated to 220° C. under nitrogen with stirring, activated copper (50.0 g) is added gradually during 1 hour. The reaction mixture is stirred at 220° C. under nitrogen for another 3 hours, and the mixture is then extracted with boiling acetone, and filtered while hot to remove copper and sand. The acetone is thereafter removed from the filtrate under reduced pressure. The residue is recrystallized from methanol two times to yield 45 percent of yellow crystals: mp 176.5°–177.0° C.

2,2'-Bis(carboxylic acid)-4,4'-dinitrophenyl

A mixture of 2,2'-bis(carbomethoxy)-4,4'-dinitrobiphenyl (10.0 g, 27.8 mmol), 150 ml of acetic acid, 10 ml of concentrated sulfuric acid and 40 ml of water is added to a 500 ml, three-necked round-bottom flask equipped with an overhead stirrer and a condenser. The slurry solution is heated to 120° C. for 24 hours and then allowed to cool with the product subsequently being collected by filtration of the slurry reaction solution, washed with cold water until PH=6–7, then with cold methanol, and finally dried at 110° C. under reduced pressure to produce 7.8 g (85 percent) of pale yellow powder: mp 257°–258° C.

2,2'-Bis(carboxylic acid chloride)-4,4'-dinitrobiphenyl

A mixture of 2,2'-bis(carboxylic acid)-4,4'-dinitrobiphenyl (5.0 g, 18.6 mmol) and thionyl chloride (70 ml, 0.93 mol) is heated at reflux for 4 hours. Excess thionyl chloride is removed by distillation, and the residue is dried at 85° C. under vacuum overnight in the same reactor, after which it is ready to use in the following reaction.

2,2'-Bis(carboxy-N-caprolactam)-4,4'-dinitrobiphenyl

A solution of ε-caprolactam (2.1 g, 18.6 mmol) in 50 ml of benzene is added to the above reactor containing 18.6 mmol of 2,2'-bis(carboxylic acid chloride)-4,4'-dinitrobiphenyl. The mixture is heated to 80°–90° C., and after all the reactants are dissolved, 20 ml of pyridine is added. The solution is stirred at 90° C. for 3 hours, after which the pyridine/acid chloride salt is removed by filtration. Solvents are then removed from the filtrate under reduced pressure, and the product is purified by chromatography using silica gel as filler and ethyl acetate/hexane as eluate to yield 55 percent of pale yellow crystals.

2,2'-Bis(carboxy-N-caprolactam)-4,4'-diaminobiphenyl

A mixture of 2,2'-bis(carboxy-N-caprolactam) 4,4'-dinitrobiphenyl (2.00 g, 5.77 mmol), 0.08 g of palladium on activated carbon (palladium content 5 percent) and 30 ml of absolute ethanol is stirred with hydrogen under 1 atmosphere at 0°–5° C. in a hydrogenator. When the theoretical quantity (34.6 mmol) of hydrogen has been absorbed, the solution is filtered through celite under nitrogen to remove the catalyst. Ethanol is then removed from the filtrate under reduced pressure, following which the residue is dissolved in methylene chloride. The solution is then filtered through celite under nitrogen, after which the product is obtained by removing solvent under reduced pressure to yield 80 percent of yellow powder.

EXAMPLE 4

Synthesis of 4-aminobenzoyl caprolactam end-cap

4-Nitrobenzoyl caprolactam

A mixture of 4-nitrobenzoyl chloride (50.16 g, 0.27 mol), freshly distilled ε-caprolactam (30.59 g, 0.27 mol), and 500 ml of benzene are added to a 1L three-necked round-bottom flask equipped with an overhead stirrer, condenser and a nitrogen inlet tube. The solution is heated to 90°–100° C. and after all the solids are dissolved, 160 ml of pyridine is added. White pyridine salts form immediately, the reaction solution being kept at 90°–100° C. for 1 hour. The pyridine salts are removed by filtration, and the solvent is separated from the filtrate under reduced pressure. The residue is washed with a 5 percent NaHCO$_3$ aqueous solution and with distilled water several times before being dried. The product is then recrystallized from a mixture of ethyl acetate and hexane to obtain 67 g (95 percent) of white crystals: mp 105°–106° C.

4-Aminobenzoyl caprolactam end-cap

A mixture of 4-nitrobenzoyl caprolactam (9.05 g, 0.0345 mol), 0.50 g of 5 percent palladium on carbon and 120 ml of absolute ethanol is stirred with hydrogen under 1 atmosphere at room temperature. When the theoretical quantity of hydrogen (0.1035 mol, 2568 ml) has been absorbed, the solution is filtered through celite, producing white, needle-like crystals when the filtrate is kept in a freezer. The product is obtained by filtration and washing by cold ethyl ether to obtain a yield of 6.0 g (75 percent) of white crystal: mp 152°–153° C.

EXAMPLE 5

1,2,4-Trimellitoyl anhydride N-caprolactam end-cap

A mixture of trimellitic chloride (40.00 g, 0.19 mol), freshly distilled ε-caprolactam (21.50 g, 0.19 mol), and 400 mol of benzene is added to a 1L three-necked round-bottom flask equipped with an overhead stirrer, condenser and a nitrogen inlet tube. The solution is heated to 90°–100° C. After all the solids are dissolved, 150 ml of pyridine is added. White pyridine salts form immediately, the reaction solution being kept at 90°–100° C. for 1 hour before removing the pyridine salts by filtration. The solvent is separated from the filtrate under reduced pressure, and the residue is washed with a 5 percent NaHCO$_3$ aqueous solution and distilled water several times and dried. The product is recrystallized from a mixture of ethyl acetate and hexane to obtain 37 g (85 percent) of white crystals.

EXAMPLE 6

Polymerization of 3,5-Bis(4-aminophenoxy)benzoyl caprolactam and 3,3',4,4'-Biphenyl tetracarboxylic dianhydride (BPDA)

3,5-Bis(4-aminophenoxy)benzoyl caprolactam (DAPBC) (1.5000 g, 3.477 mmol) and 15 g of NMP are added to a 50 ml, three-necked, round-bottom flask equipped with an overhead stirrer and a nitrogen inlet and outlet. After the diamine has dissolved completely, BPDA (1.0229 g, 3.477 mmol) is added. Thereafter, the mixture is stirred at room temperature for 24 hours and pyridine (0.633 g, 8.00 mmol) and acetic anhydride (0.816 g, 8.00 mmol) are added. The resulting solution is stirred at room temperature for another 24 hours, with the polymer solution then being diluted with N-methyl-2-pyrolidene (NMP) and slowly added to vigorously stirred ethanol. The polymer that precipitates is collected by filtration, washed with ethanol and ethyl ether, before being dried at room temperature under reduced pressure.

EXAMPLE 7

Polymerization of 3,5-Bis(4-aminophenoxy)benzoyl caprolactam, 3,3'-dimethyl-4,4'-diaminobiphenyl (OTOL) and BPDA 3,5-Bis(4-aminophenoxy)benzoyl caprolactam (DAPBC) (1.000 g, 2.318 mmol) and 10 g of NMP are added to a 50 ml, three-necked, round-bottom flask equipped with an overhead stirrer and a nitrogen inlet and outlet. After the diamine has dissolved completely, BPDA (0.9741 g, 3.311 mmol) is added. The mixture is thereafter stirred at room temperature for 10 hours, and OTOL (0.2109 g, 0.993 mmol) and 3 g of NMP are then added. After being stirred for another 20 hours, 6 g of NMP is also added to dilute the viscous solution, and pyridine (0.577 g, 7.30 mmol) and acetic anhydride (0.745 g, 7.30 mmol) are added. The resulting solution is stirred at room temperature for 24 hours, after which the polymer solution is diluted with NMP and then slowly added to vigorously stirred ethanol. The polymer that precipitates is collected by filtration, washed with ethanol and ethyl ether, before being dried at room temperature under reduced pressure.

EXAMPLE 8

Polymerization of 3,5-Diaminobenzoyl caprolactam and BPDA 3,5-Diaminobenzoyl caprolactam (DABC) (1.0000 g, 4.287 mmol) and 18 g of NMP are added to a 50 ml, three-necked, round-bottom flask equipped with an overhead stirrer and a nitrogen inlet and outlet. After the diamine has dissolved completely, BPDA (1.2611 g, 4.287 mmol) is added, and the mixture is stirred at room temperature for 24 hours before 4 g of NMP is also added, to dilute the viscous solution, followed by pyridine (0.780 g, 9.86 mmol) and acetic anhydride (1.007 g, 9.86 mmol). The resulting solution is stirred at room temperature for another 24 hours and the polymer solution is diluted with NMP, following which it is slowly added to vigorously stirred ethanol. The polymer that precipitates is collected by filtration, washed with ethanol and ethyl ether, and dried at room temperature under reduced pressure.

EXAMPLE 9

Polymerization of 3,5-Diaminobenzoyl caprolactam, 2,2'-Bis(trifluoromethyl)benzidine (PFMB) and BPDA 3,5-Diaminobenzoyl caprolactam (DABC) (1.0000 g, 4.287 mmol) and 15 g of NMP are added to a 50 ml, three-necked, round-bottom flask equipped with an overhead stirrer and a nitrogen inlet and outlet. After the diamine has dissolved completely, BPDA (1.5766 g, 5.359 mmol) is added, and the mixture is stirred at room temperature for 10 hours. PFMB, previously prepared by standard procedures, (0.342 g, 1.072 mmol), and 4 g of NMP are then added. After being stirred for another 20 hours, 6 g of NMP is added to dilute the viscous solution, followed by pyridine (0.975 g, 12.3 mmol) and acetic anhydride (1.258 g, 12.3 mmol). The resulting solution is stirred at room temperature for 24 hours before being diluted with NMP and then slowly added to vigorously stirred ethanol. The polymer that precipitates is collected by filtration, washed with ethanol and ethyl ether, and dried at room temperature under reduced pressure.

EXAMPLE 10

Graft Polymerization Based on the Polyimide Obtained from 3,5-Bis(4-diaminophenoxy)benzoyl caprolactam and BPDA Preparation of Anionic Initiator Solution for Ring-Opening Polymerization of ε-Caprolactam A 250-ml beaker equipped with an overhead stirrer, nitrogen inlet and covered by aluminum foil, is purged with dry nitrogen, and ε-caprolactam (4.0 g, 35 mmol) is charged. After the solid is melted by heating to 120°–140° C., phenylmagnesium bromide solution (0.48 ml, 1.45 mmol) (PhMgBr:N-acylated caprolactam moieties in polyimide= 1:1 molar ratio) is injected and stirred under nitrogen. The homogeneous solution formed is then ready to be used as the initiator for anionic ring-opening polymerization of ε-caprolactam.

Preparation of Polyimide Activator Solution

A four-necked, 50-ml, resin kettle equipped with an overhead stirrer and a nitrogen inlet is purged with dry nitrogen and ε-caprolactam (15.0 g, 0.133 mol) is charged. After the solid is melted by heating to 120°–140° C., the polyimide (1,0 g, 1.45 mmol of acylated caprolactam moieties), obtained from 3,5-Bis(4-aminophenoxy)benzoyl caprolactam and BPDA, is gradually added into the melted ε-caprolactam and stirred under nitrogen at 140° C. for 1 hour.

Graft Copolymerization

The polyimide activator solution is poured into the previously prepared anionic initiator solution under nitrogen and stirred at 140° C. The mixture solidifies within 2 minutes and is maintained at 140° C. for 1 hour under nitrogen. A homogenous, tough yellow polymer is thus obtained. The copolymer containing 5 weight percent of polyimide is cut into small pieces, extracted by methanol and NMP, and dried at 150° under vacuum, to produce the reinforced product.

EXAMPLE 11

Graft Polymerization Based on the Polyimide Obtained from 3,5-Bis(4-aminophenoxy)benzoyl caprolactam, OTOL and BPDA Preparation of Anionic Initiator Solution To a 250-ml beaker equipped with an overhead stirrer, nitrogen inlet and covered by aluminum foil, which has been previously purged with dry nitrogen, ε-caprolactam (4.13 g, 36.5 mmol) is charged. After the solid is melted by heating to 120°–140° C., phenylmagnesium bromide solution (0.29 ml, 0.86 mmol) (PhMgBr:N-acylated caprolactam moieties in polyimide=1:1 molar ratio) is injected and stirred under nitrogen. The homogeneous solution formed is then ready to be used as the initiator for anionic ring-opening polymerization of ε-caprolactam.

Preparation of Polyimide Activator Solution

To a four-necked, 50-ml, resin kettle equipped with an overhead stirrer and a nitrogen inlet, and previously purged with dry nitrogen, ε-caprolactam (14.85 g, 0.131 mol) is charged. After the solid melts by being heated to 120°–140° C., the polyimide (1.0 g, 0.86 mmol of acylated caprolactam moieties), which is obtained from 3,5-bis(4,-aminophenoxy-)benzoyl caprolactam, OTOL and BPDA (50:50:100 molar ratio), is gradually added into melted ε-caprolactam and stirred under nitrogen at 140° C. for 1 hour.

Graft Copolymerization

The above polyimide activator solution is poured into the previously prepared anionic initiator solution under nitrogen and stirred at 140° C. The mixture solidifies within 2 minutes and is held at 140° C. for 1 hour under nitrogen. A homogenous yellow, tough polymer is obtained. The polymer, containing 5 weight percent of polyimide, is cut into small pieces, extracted by methanol and NMP, and dried at 150° C. under vacuum, yielding the desired product.

EXAMPLE 12

N-acylated caprolactam end-capped polyimide based on OTOL and BPDA

To a solution of OTOL in NMP, excess moles of BPDA solid (according to the target molecular weight) are added. The mixture is stirred at ambient temperature under nitrogen for 10 hours. The end-cap agent 4-aminobenzoyl caprolactam is then added. After the reaction has been continued for another 10 hours, a mixture of pyridine and acetic anhydride is added, and the reaction carried out for 24 hours to produce the desired product.

EXAMPLE 13

N-Acylated Caprolactam End-Capped Polyimide Based on OTOL, BPDA and 2,2'-Bis(3,4-dicarboxyphenyl)hexafluoropropane dianhydride (6FDA)

To a solution of OTOL (0.60000 g, 2.826 mmol) in 10 g of NMP, BPDA (0.4554 g, 1.548 mmol) is added. After the mixture is stirred at ambient temperature under nitrogen for 5 hours, 6FDA (0.6876 g, 1.548 mmol) is added and stirred for an additional 10 hours. Then 4-aminobenzoyl caprolactam (0.1253 g, 0.5396 mmol) is added. After the reaction has continued for another 10 hours, pyridine (0.563 g, 3.10 mmol) and acetic anhydride (0.727 g, 3.10 mmol) are added, and the reaction is carried out for 24 hours. The polymer solution is subsequently diluted with NMP and poured into methanol. The end-capped polyimide (OTOL:BPDA:6FDA=100:50:50 molar ratio, target Mn=6000 g/mol) is collected by filtration, washed with methanol and dried under reduced pressure.

EXAMPLE 14

Synthesis of Nylon 6-b-Polyimide-b-Nylon 6

Preparation of Anionic Initiator Solution

A 250-ml beaker equipped with an overhead stirrer, a nitrogen inlet, and covered by aluminum foil, is purged with dry nitrogen, and ε-caprolactam (4.0 g, 35 mmol) is then charged. After the solid is melted by being heated to 120°–140° C., Phenylmagnesium bromide solution (0.1 ml, 0.3 mmol) (PhMgBr:N-acylated caprolactam moieties in polyimide=1:1 molar ratio) is injected and stirred under nitrogen. The homogeneous solution formed is then ready to be used as the initiator for anionic ring-opening polymerization of ε-caprolactam.

Preparation of Polyimide Coinitiator Solution

A four-necked, 50-ml, resin kettle equipped with an overhead stirrer and a nitrogen inlet is purged with dry nitrogen, and ε-caprolactam (24.0 g, 0.21 mol) is thereafter charged. After the solid is melted by heating to 120°–140° C., the polyimide (1.8 g, 0.3 mmol of acylated caprolactam moieties), which is obtained from OTOL/BPDA/6FDA with a molar ratio of 100:50:50 and a target Mn of 12,000, is gradually added into melted ε-caprolactam and stirred under nitrogen at 140° C. for 1 hour to form a homogeneous solution.

Block Copolymerization

The latter polyimide solution is poured into the previously prepared anionic initiator solution under nitrogen and stirred at 140° C. The mixture solidifies within 8 minutes land is maintained at 140° C. for 1 hour under nitrogen. A homogeneous tough yellow polymer is obtained. The N-acylated caprolactam end-capped polymer containing 6 weight percent of polyimide (OTOL:BPDA:6FDA 100:50:50) is cut into small pieces, extracted with methanol and NMP, and dried at 150° C. under vacuum.

EXAMPLE 15

Synthesis of Nylon 6-b-Polyimide-b-Nylon 6

Preparation of Anionic Initiator Solution

A 250-ml beaker equipped with an overhead stirrer, nitrogen inlet and covered by aluminum foil, is purged with dry nitrogen, and ε-caprolactam (2.9 g, 25 mmol) is charged. After the solid is melted by heating to 120°–140° C., Phenylmagnesium bromide solution (0.23 ml, 0.7 mmol) (PhMgBr:N-acylated caprolactam moieties in polyimide= 1:1 molar ratio) is injected and stirred under nitrogen. The homogeneous solution formed is then ready to be used as the initiator for anionic ring-opening polymerization of ε-caprolactam.

Preparation of Polyimide Coinitiator Solution

To a four-necked, 50-ml, resin kettle equipped with an overhead stirrer and a nitrogen inlet, previously charged with dry nitrogen, ε-caprolactam (25.0 g, 0.22 mol) is charged. After the solid is melted by heating to 120°–140° C., the polyimide (2.1 g, 0.7 mmol of acrylated caprolactam moieties), obtained from OTOL/BPDA/6FDA with a molar ratio of 100:50:50 and a target Mn of 6,000, is gradually added into melted ε-caprolactam and stirred under nitrogen at 140° C. for 1 hour to form a homogeneous solution.

Block Copolymerization

The latter polyimide solution is poured into the previously prepared anionic initiator solution under nitrogen and stirred at 140° C. The mixture solidifies within 8 minutes and is maintained at 140° C. for 1 hour under nitrogen. A homogeneous tough yellow polymer is obtained. The N-acylated caprolactam end-capped polymer containing 7 weight percent of polyimide (OTOL:BPDA:6FDA- 100:50:50) is cut into small pieces, extracted by methanol and NMP, and dried at 150° C. under vacuum.

EXAMPLE 16

A polyimide of the type set forth in connection with Table 1 is combined with ε-caprolactam by the methods previously described to provide a block copolymer of the invention having a number average molecular weight of about 40,000 to 50,000. The copolymer then is dried under reduced pressure before being melt spun at from about 245°–265° C. from an Instron Capillary Rheometer fitted with a capillary die of 1.5 mm diameter and a length/diameter ratio of 30. The fibers are taken up on an 8.1 cm diameter roll using a speed controlled take-up motor. Some of the fiber is thereafter drawn first at room temperature to maximum draw, and then at 140° C., for a total draw of 4X. The drawn fibers exhibit the following physical characteristics.

| | Mechanical Properties of Nylon 6-b-PI-b-Nylon 6 Fibers[a] | | |
|---|---|---|---|
| Wt. % PI in Nylon 6[b] Feed | Mn of PI[c] | Tensile Strength (g/d) | Elongation (%) |
| 0%[b] | | 5.3 | 130 |
| 3% | 6000 | 6.2 | 160 |
| 5% | 6000 | 7.0 | 183 |
| 4% | 12000 | 7.5 | 217 |
| 5% | 12000 | 7.5 | 160 |

[a]The fibers were melt spun at 260° C., then drawn at room temperature and 140° C. (400%).
[b]Nylon 6 (Allied Signal, Capron 8202).
[c]Polyimide described in TABLE I.

While in accordance with the Patent Statutes, a preferred embodiment and best mode has been presented, the scope of the invention is not limited thereto, but rather is measured by the scope of the attached claims.

What is claimed is:

1. A process for making a polyimide-nylon 6 copolymer that includes:
   preparing a reaction mixture comprising combining
   (a) a rigid-backbone polyimide to which is attached at least one caprolactam ring having an acyl group attached to the nitrogen atom contained in said ring, said acyl group activating said ring, with
   (b) molten caprolactam and thereafter initiating polymerization of said molten caprolactam in said mixture, whereupon nylon 6 chains propagate from said rings to form a molecularly-reinforced copolymer.

2. A process according to claim 1 in which said rigid-backbone polyimide includes a polycondensation product of aromatic diamines with aromatic dianhydrides.

3. A process according to claim 1, wherein said rigid-backbone polyimide comprises a reaction product of one or more diamines, at least one of which incorporates said acyl-activated caprolactam therein, and at least one dianhydride, said reaction product having at least one acylated caprolactam group pendant therefrom.

4. A process according to claim 3, wherein one of said diamines is selected from the group consisting of 3,5-bis(4, 4'-diaminophenoxyl)benzoyl caprolactam; 3,5-diaminobenzoyl caprolactam; and 2,2'-Bis(carboxy-N-caprolactam)-4,4'-diaminobiphenyl.

5. A process according to claim 1, wherein said rigid-backbone polyimide comprises an oligomer formed from at least one diamine and at least one dianhydride, said polyimide being end-capped with an aromatic monofunctional amine containing an acyl-activated caprolactam ring.

6. A process according to claim 4, wherein said oligomer is end-capped with 4-aminobenzoyl caprolactam.

7. A process according to claim 1, wherein said rigid-backbone polyimide comprises an oligomer formed from at least one diamine and at least one dianhydride, said oligomer being end-capped with a mono-functional phthalic anhydride containing an acyl-activated caprolactam ring.

8. A process according to claim 7, wherein said oligomer is end-capped with 1,2,4-trimellitoyl-N-caprolactam anhydride.

9. A polyimide-nylon 6 copolymer formed according to the process of claim 1.

10. A multi-component blend which includes a polyimide-nylon 6 copolymer according to claim 9, together with at least one polyamide.

11. A multi-component blend according to claim 10, wherein at least one of said polyamides is nylon 6.

12. A polyimide-nylon 6 copolymer according to claim 9, wherein a member selected from the group consisting of 3,5-bis(4,4'-diaminophenoxy)benzoyl caprolactam; 3,5-diaminobenzoyl caprolactam; and 2,2'-Bis(carboxy-N-caprolactam)- 4,4'-diaminobiphenyl is used to prepare said polyimide.

13. A polyimide-nylon 6 copolymer according to claim 9, wherein 4-aminobenzoyl caprolactam is used to prepare said copolymer.

14. A polyimide-nylon 6 copolymer according to claim 9, wherein 1,2,4-trimellitoyl-N-caprolactam anhydride is used to prepare said copolymer.

15. A fiber prepared from a polyimide-nylon 6 copolymer according to claim 9.

16. A fiber according to claim 15 that includes as a blending component at least one polyamide.

17. A fiber according to claim 16, in which said blending component is nylon-6.

* * * * *